(12) United States Patent
Hisch

(10) Patent No.: US 10,239,501 B2
(45) Date of Patent: Mar. 26, 2019

(54) UNDERSIDE WASHING DEVICE FOR AN AUTOMOBILE

(71) Applicant: Thomas Hisch, Mahanoy City, PA (US)

(72) Inventor: Thomas Hisch, Mahanoy City, PA (US)

( * ) Notice: Subject to any disclaimer, the term of this patent is extended or adjusted under 35 U.S.C. 154(b) by 0 days.

(21) Appl. No.: 15/226,350

(22) Filed: Aug. 2, 2016

(65) Prior Publication Data

US 2018/0037198 A1 Feb. 8, 2018

(51) Int. Cl.
| | | |
|---|---|---|
| *B60S 3/04* | (2006.01) | |
| *B05B 13/02* | (2006.01) | |
| *B05B 1/18* | (2006.01) | |
| *B05B 7/26* | (2006.01) | |
| *B08B 3/02* | (2006.01) | |

(52) U.S. Cl.
CPC ............... *B60S 3/044* (2013.01); *B05B 1/18* (2013.01); *B05B 7/26* (2013.01); *B05B 13/0278* (2013.01); *B08B 3/024* (2013.01); *B08B 3/026* (2013.01); *B60S 3/042* (2013.01)

(58) Field of Classification Search
CPC ......... B05B 1/18; B05B 7/26; B05B 13/0278; B08B 3/02; B60S 3/044
See application file for complete search history.

(56) References Cited

U.S. PATENT DOCUMENTS

| | | | |
|---|---|---|---|
| 4,580,726 A | | 4/1986 | Unger |
| 5,092,493 A | * | 3/1992 | Pehr .................... B65D 50/067 |
| | | | 215/215 |
| 5,707,014 A | | 1/1998 | Chan et al. |
| 5,957,387 A | * | 9/1999 | Porta ..................... B05B 1/1618 |
| | | | 239/310 |
| 6,045,064 A | * | 4/2000 | Abraham ................ B60S 3/042 |
| | | | 239/722 |
| 6,131,831 A | | 10/2000 | Lawrence |
| 7,208,051 B2 | | 4/2007 | Zinski et al. |

* cited by examiner

*Primary Examiner* — Katelyn B Whatley
(74) *Attorney, Agent, or Firm* — S&L US IP Attorneys, P.C.; Timothy Marc Shropshire; Eric Brandon Lovell

(57) ABSTRACT

A device to wash an underside of an automobile comprises a handle comprising a first end and a second end, wherein a fluid flow through the first end of the handle is regulated via a valve member, wherein the handle comprises a canister to store and dispense one or more detergents during the wash. A pipe section fixedly attached to and extending obliquely from the second end of the handle to couple with a horizontal member via an elbow section and the horizontal member comprising a spraying head positioned at a distal end of the horizontal member, wherein the spraying head comprises a plurality of nozzles to spray the fluid in the underside of the automobile during the wash. A method of washing an underside of an automobile using the device is also disclosed.

13 Claims, 5 Drawing Sheets

UNDERSIDE WASHING DEVICE FOR AN AUTOMOBILE

BACKGROUND

Automobile vehicles are inevitable when it comes to transportation. In the recent days, the number of vehicles which ply on roads is countless and on the other hand, pollution and road conditions makes the life really tough for drivers as well as vehicles. Vehicles are continuously prone to damages on its exterior body over a period of time as the body of the vehicle comes in contact with foreign objects and salts. The rusting salts are hard to remove as they start corroding the painted material on the exterior surface of the car and eventually damages the part completely if not cleaned properly.

The exterior surfaces of the vehicle other except underside is always kept clean as it is easily reachable to clean. However, the underside of the vehicle is always tough to reach and user has to attempt the cleaning after a lot of struggle. Even after lot of efforts, the rusting on the underside still persists and tend to damage the part over prolonged use. Further, grime dirt that gets collected on the underside which is again tough to access and clean. Therefore, the efficiency and life of the underside of the vehicle gets deteriorated.

People generally use many prior art washing devices to clean the underside of the vehicle. But these devices are expensive and complex design and therefore, user has to make many efforts to clean efficiently. Further, all of these devices are heavier to use mainly for cleaning the top and middle sections of the automobile and does not provide adequate spraying on the underside. The maneuverability is also a limiting factor in these devices. Further, soap detergents help in cleaning all the grime dirt very easily but with these prior art washing devices consists of an additional system for dispensing which makes the cleaning process much more complex. Also storage of these devices is also a weighing factor as many devices consume lot of space for storage. The aesthetic appearance of the exterior body of the automobile is lost as these devices do not clean the parts efficiently.

People generally use many prior art washing devices to clean the underside of the vehicle. But these devices are expensive and complex design and therefore, user has to make many efforts to clean efficiently. Further, all of these devices are heavier to use and also does not provide efficient spraying on the underside. The maneuverability is also a limiting factor in these devices. Further, soap detergents help in cleaning all the grime dirt very easily but with these prior art washing devices consists of an additional system for dispensing which makes the cleaning process much more complex. Also accommodation of these devices is also a weighing factor as many devices consume lot of space for storage.

Prior art reference U.S. Pat. No. 7,208,051 B2 discloses a device for cleaning underside of a vehicle wherein the device comprises a torso and set of wheels with a I-shaped nozzle for spraying the fluid. However, the spraying head does not help in cleaning the underside very efficiently and also there is no integrated soap dispenser.

In light of the aforementioned drawbacks and limitations, there exists a need for a portable and lightweight washing device for cleaning the underside of the automobile vehicle to remove all the deposited rusting salts and grime dirt.

SUMMARY

The objective of the present invention is to provide a portable device to wash an underside of an automobile. The system and method are disclosed for cleaning the underside of the automobile to remove all the rusting salts and grime dirt.

According one embodiment of the present invention, the device for washing the underside of the automobile comprises a handle comprising a first end and a second end, wherein a fluid flow through the first end of the handle is regulated via a valve member, wherein the handle comprises a canister to store and dispense one or more detergents during the wash. A pipe section fixedly attached to and extending obliquely from the second end of the handle to couple with a horizontal member via an elbow section and the horizontal member comprising a spraying head positioned at a distal end of the horizontal member, wherein the spraying head comprises a plurality of nozzles to spray the fluid in the underside of the automobile during the wash.

According to another embodiment of the present invention, the method of washing the underside of the automobile comprises a device with a handle with a first end and a second end, regulating the flow of fluid through the first end of the handle via a valve member towards a pipe section. Positioning the device on a planar surface via the horizontal member and spraying a fluid via a spraying head positioned at a distal end of the horizontal member.

BRIEF DESCRIPTIONS OF SEVERAL VIEWS OF DRAWINGS

DETAILED DESCRIPTION OF DIFFERENT EMBODIMENTS

In different exemplary embodiments, the technology described herein discloses a portable device and methods for meat storage, tenderizing, and aging in a temperature and humidity controlled environment.

The present invention is related to a device 100 for cleaning an underside of an automobile to removing all the rusting salts and grime dirt.

Figure 1:
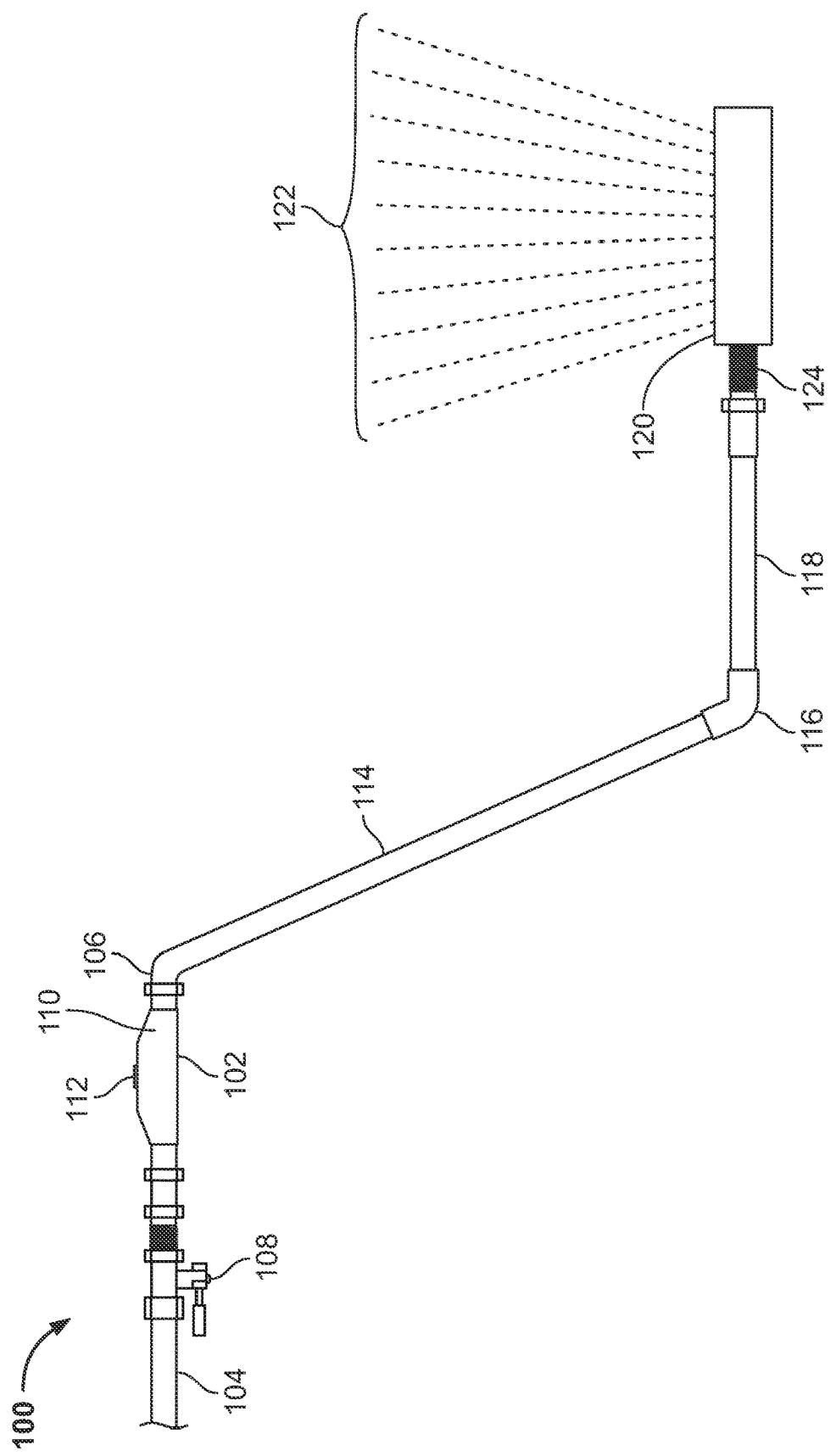
FIG. 1 illustrates a right-side elevational view of the washing device, according to an embodiment of the present invention.
Figure 2:
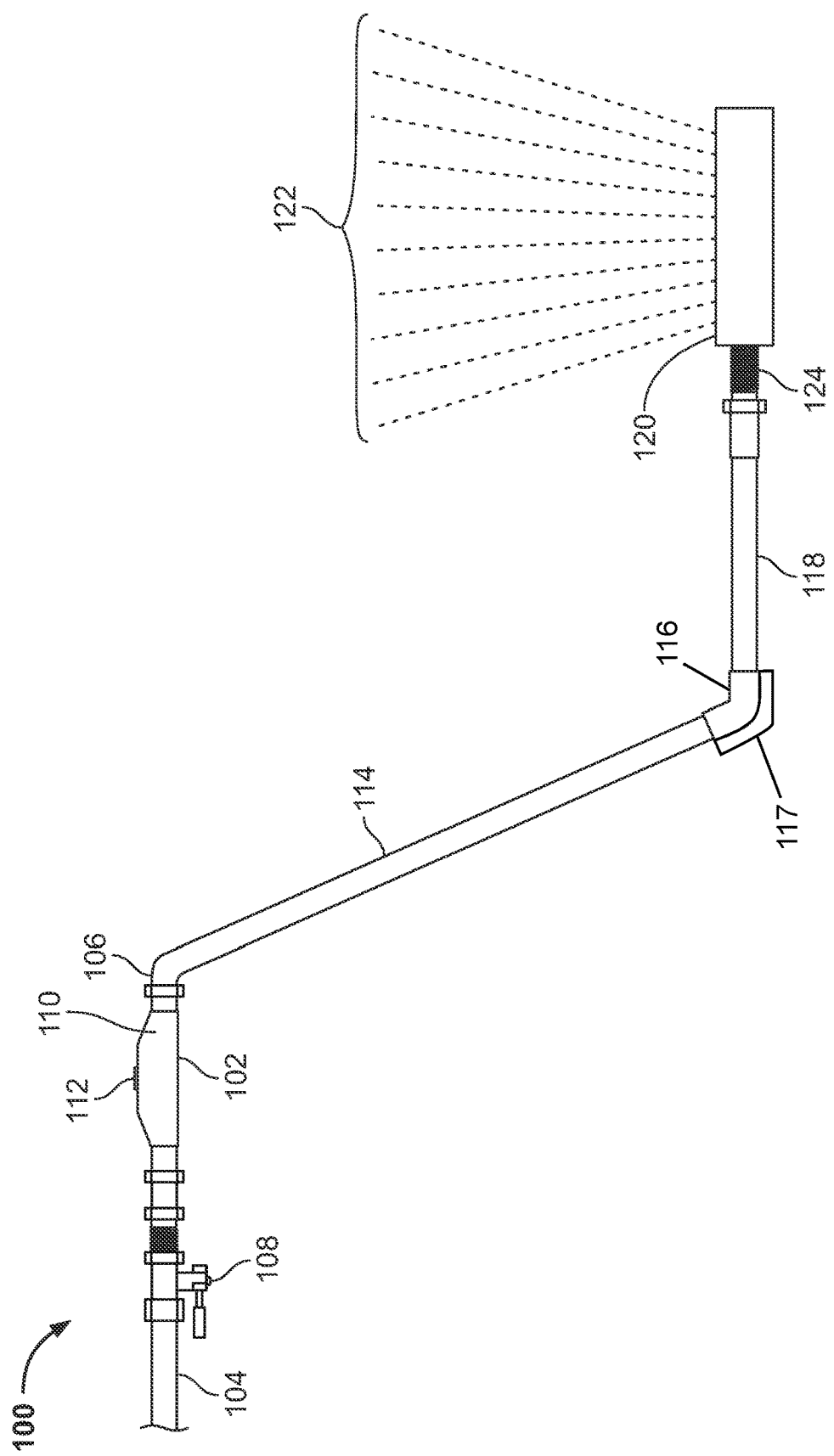
FIG. 2 illustrates a right-side elevational view of the washing device, according to an embodiment of the present invention.

Referring now to FIGS. 1-2, the device 100 comprises a handle 102 comprising a first end 104 and a second end 106, wherein a fluid flow through the first end 104 of the handle 102 is regulated via a valve member 108, wherein the handle 102 comprises a canister 110 to store and dispense one or more detergents during the wash. A pressurized fluid source or a garden hose is removably attached to the first end 104 of the handle 102 of the device 100 to provide fluid for cleaning the underside of the automobile. The valve member 108 is a typical ON/OFF regulating device to control the flow of fluid that comes from the fluid source to pass through the first end 104 of the handle 102.

In an embodiment, according to the present invention, the device 100 comprises a pipe section 114 fixedly attached to and extending obliquely from the second end 106 of the handle 102 to couple with a horizontal member 118 via an elbow section 116. The elbow section 116 comprises a wear plate 117 to prevent the pipe section 114 from wearing out. The pipe section 114 is generally made from one of a carbon fiber, aluminum and stainless steel. The horizontal member 118 comprising a spraying head 120 positioned at a distal end of the horizontal member 118.

Figure 3:
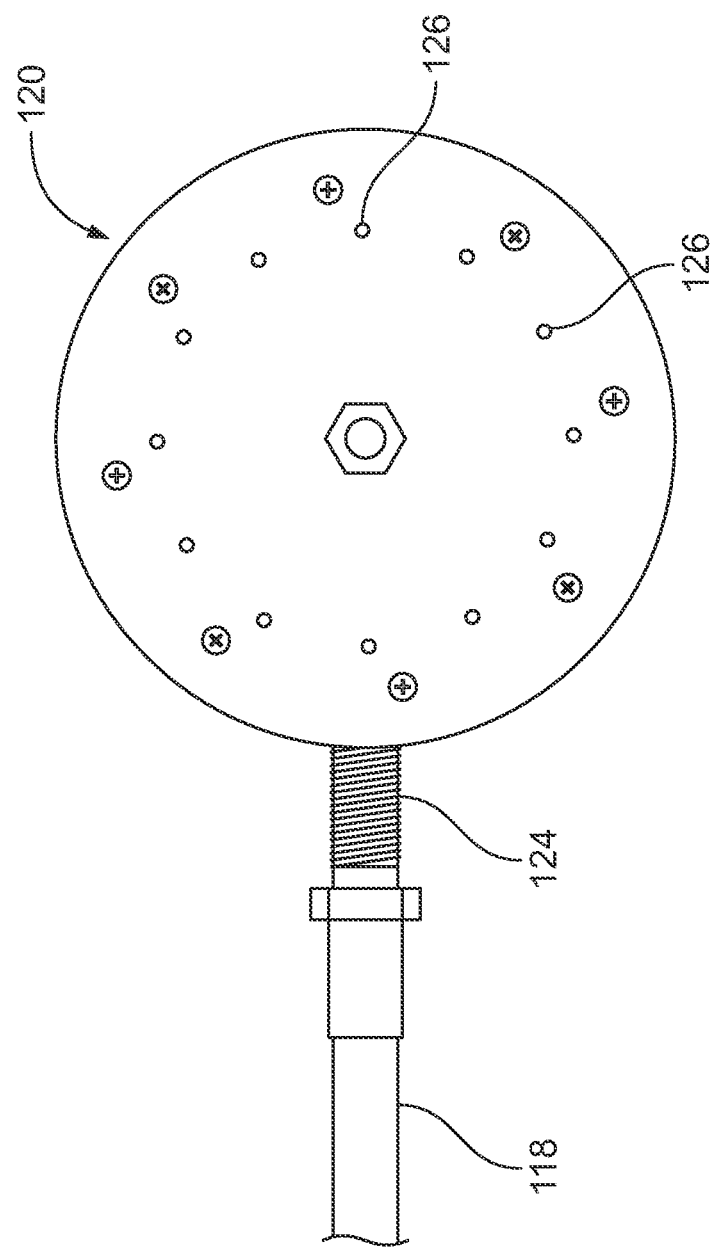
FIG. 3 illustrates a top plan view of the spraying head of the washing device, according to an embodiment of the present invention.
Figure 4:
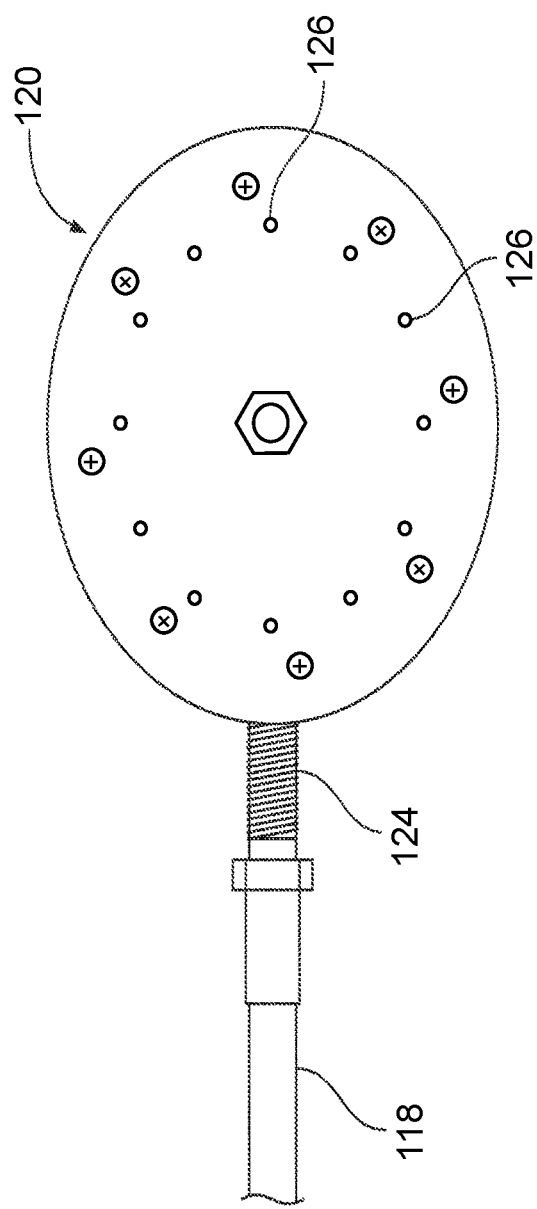
FIG. 4 illustrates a top plan view of the spraying head of the washing device, according to an embodiment of the present invention.

Referring to FIGS. 3-4, the spraying head 120 comprises a plurality of nozzles 126 to spray the fluid at different rates to multiple positions in the underside of the automobile. The spraying head 120 is one of a substantially circular cross-section, and an elliptical in cross-section and it is fastened to the horizontal member 118. In an exemplary embodiment, the spraying head 120 comprises at least twelve nozzles 126 which are equally spaced for a spray pattern 122 to clean the underside of the automobile. The horizontal member 118 further comprises a swivel joint 124 fixedly attached to the spraying head 120 to allow free rotation of the spraying head 120 during the wash. The swivel joint 124 attached to the spraying head 120 helps to enhance the maneuverability of the spraying head 120 so that the spraying head 120 can move side to side as well as on other axis to provide a better washing method to clean all the dirt from the underside of the automobile.

Figure 5:
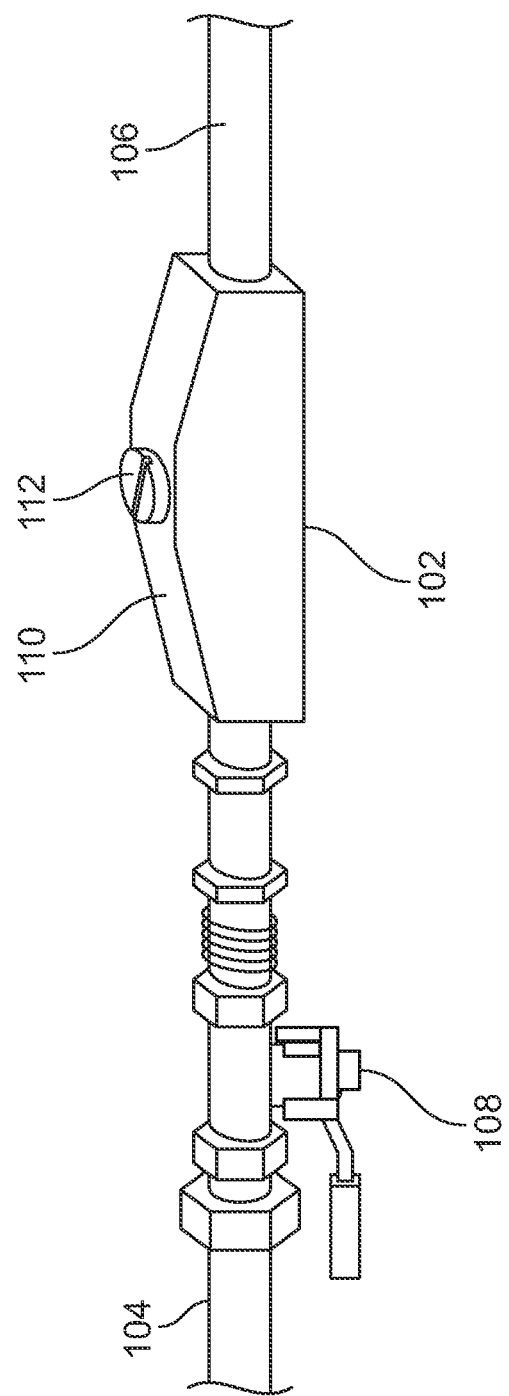
FIG. 5 illustrates a perspective view of the handle, according to an embodiment of the present invention.

Referring to FIG. 5, the handle 102 comprises the first end 104 and the second end 106 to define a canister 110 to hold and dispense detergents during the wash, in other words, the handle 102 acts as a canister 110 to receive and store a detergent pill for washing the underside of the automobile. The canister 110 comprises a cap member 112 to place a detergent pill to dispense detergents during the wash. The cap member 112 comprises an access opening, wherein the access opening is configured to be turned by at least one of a screw driver and a coin. During the wash, with the help of the valve member 108, the fluid flow can be regulated and the pressurized fluid is sent to the horizontal member 118 via the pipe section 114.

A method of washing an underside of an automobile comprises the following steps: a) providing a device 100 comprising: a handle 102 comprising a first end 104 and a second end 106, regulating a fluid flow through the first end 104 of the handle 102 via a valve member 108, b) storing and dispensing one or more detergents via a canister 110 during the wash, c) a pipe section 114 fixedly attached to and extending obliquely from the second end 106 of the handle 102 to couple with a horizontal member 118 via an elbow section 116 and d) spraying the fluid in the underside of the automobile during the wash via a spraying head 120 positioned at a distal end of the horizontal member 118, wherein the spraying head 120 comprising a plurality of nozzles 126 to spray the fluid in the underside of the automobile during the wash.

As an exemplary embodiment, the pipe section 114 can be broadened with any length to match the requirements. However, according to the present invention, ½-inch pipe section 114 can be used to direct the fluid towards the horizontal member 118. Further, ½-inch pipe section 114 is inclined at an angle of about 45 degrees with respect to the horizontal member 118 so that a user can easily maneuver the device 100 to the underside of the automobile during the washing. In other words, the oblique pipe section 114 helps to provide easy access for the user to cover the entire underside of the automobile and controlled by a handle 102 of the device 100. The user is not required to bend or come down to do the cleaning as the user can clean the underside of the automobile by just standing up in a normal position. Further, ⅜-inch swivel joint 124 can be attached to the spraying head 120 to allow free rotation of the spraying head 120 for controlled spray. The spraying head 120 can be configured to have 5 inches in length and the length of the horizontal member 118 can be made for 16 inches.

Although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein.

I claim:

1. A device for washing an underside of an automobile, the device comprising:
   a. a handle including a first end and a second end, the handle comprising:
      i. a connector disposed at the first end for removably connecting a fluid source to the handle; and
      ii. a canister disposed between the first end and the second end, wherein a proximal end of canister is attached to the first end, and wherein a distal end of the canister is attached to the second end, wherein the canister is linearly aligned with the first end and the second end, wherein the canister comprises a cap member that provides access to an interior of the canister, wherein one or more detergents are stored in, and dispensed from, the canister during use;
   b. a pipe section fixedly attached to, and extending obliquely from, the second end; and
   c. a horizontal member connected to a distal end of the pipe section, the horizontal member comprising a spraying head positioned at a distal end of the horizontal member, wherein the handle is substantially parallel to the horizontal member.

2. The device of claim 1, wherein the horizontal member further comprises a swivel joint fixedly attached to the spraying head, wherein the swivel joint permits rotation of the spraying head along multiple axes.

3. The device of claim 1, wherein the one or more detergents comprises a detergent pill.

4. The device of claim 1, wherein the cap member is threadingly engaged to the canister.

5. The device of claim 1, wherein the pipe section is constructed from a material selected from the group consisting of carbon fiber, aluminum, and stainless steel.

6. The device of claim 1, further comprising an elbow section comprising a wear plate, wherein the elbow section connects the pipe section to the horizontal member, and wherein the wear plate prevents the pipe section from wearing out.

7. The device of claim 1, wherein the spraying head comprises a plurality of nozzles collectively disposed in a pattern selected from the group consisting of circular and elliptical, wherein the nozzles are equally spaced along the pattern.

8. The device of claim 7, wherein the nozzles are configured to emit the pressurized fluid at different rates and to direct the emitted fluid to multiple locations.

9. The device of claim 1, wherein the spraying head comprises at least twelve nozzles collectively disposed in a circular pattern, wherein the nozzles are equally spaced along the pattern.

10. The device of claim 1, wherein the spraying head has a substantially circular cross-section.

11. The device of claim 1, wherein the spraying head has a substantially elliptical cross-section.

12. The device of claim 1, wherein the handle further comprises a valve member disposed between the connector and the canister.

13. The device of claim 6, wherein the device is configured to slide along a ground surface during use.

\* \* \* \* \*